United States Patent

[11] 3,585,392

[72] Inventor Adrianus Korpel
Prospect Heights, Ill.
[21] Appl. No. 715,614
[22] Filed Mar. 25, 1968
[45] Patented June 15, 1971
[73] Assignee Zenith Radio Corporation
Chicago, Ill.

[54] PHASE-MODULATED LIGHT DETECTION
7 Claims, 7 Drawing Figs.

[52] U.S. Cl. .......... 250/199, 332/7.51, 350/149, 350/161
[51] Int. Cl. .......... H04b 9/00
[50] Field of Search .......... 280/199; 350/161, 149; 332/7.51

[56] References Cited
UNITED STATES PATENTS

| | | | |
|---|---|---|---|
| 2,155,659 | 4/1939 | Jeffree | 250/199 |
| 2,707,749 | 5/1955 | Mueller | 250/199 |
| 3,365,579 | 1/1968 | Emshwiller | 250/199 |
| 3,383,627 | 5/1968 | Desmares | 250/199 X |
| 3,421,003 | 1/1969 | Pratt | 250/199 |
| 3,424,906 | 1/1969 | Korpel | 332/7.51 X |
| 3,431,504 | 3/1969 | Adler | 350/161 X |

*Primary Examiner*—Richard Murray
*Assistant Examiner*—R. S. Bell
*Attorney*—Francis W. Crotty

ABSTRACT: A beam of coherent monochromatic light from a laser interacts with an acoustic wave signal in a Debye-Sears interaction cell, thereby to phase modulate the beam with the acoustic wave signal and with intelligence information carried thereby. At a fixed distance along the beam path from the interaction cell the modulation of the light beam shall have been converted from phase to amplitude modulation and a slit positioned at such location admits both the undiffracted and the first-order diffracted components of the modulated beam to a detector where the beam is demodulated and the intelligence recovered.

Increased efficiency is obtained by using a series of slits, rather than a single slit, disposed across the light beam at the aforesaid particular location.

Where Bragg angle diffraction is achieved in an interaction cell, as distinguished from Debye-Sears diffraction, the emerging light beam exhibits both amplitude and phase modulation. If the system employs two acoustic wave signals interacting with a single light beam in the cell, with the pair of acoustic wave signals having the proper angular relation, the output of the interaction cell may be demodulated as to its phase modulation content by the same technique employed in demodulating the output of the Debye-Sears diffraction cell. This increases the efficiency of the system over what is otherwise obtained if demodulation is confined to the initial amplitude modulation of the modulated light beam.

Inventor
Adrianus Korpel
By Francis W. Crotty
Attorney

Inventor
Adrianus Korpel
By Francis W. Crotty
Attorney

PHASE-MODULATED LIGHT DETECTION

The present invention pertains to optical apparatus More particularly, it relates to apparatus responsive to phase-modulated optical radiation. It may use light in either the visible or invisible portions of the spectrum.

Over the years, and especially since the development of the laser, considerable attention has been devoted to the use of light beams to convey signal information. To that end, a number of different devices have been disclosed for the purpose of modulating signals upon a beam of light. One successful light modulator employs interaction between a beam of coherent light and propagating acoustic waves the intensity of which varies in time in accordance with the modulating signal. The acoustic waves diffract a portion of the light beam with the relative intensity of the diffracted light at any instant being generally proportional to the intensity of the acoustic wave fronts. The modulation may be recovered from the beam simply by detecting it with a photodetector. The latter yields an output signal which is representative of the modulating signal previously imposed upon the beam. In many cases, the detection process is improved by simultaneously exposing the detector both to the modulated beam and to a similar, usually spatially coincident unmodulated beam. This latter approach represents an adaptation of the well-known heterodyne principle.

The modulation of the light beam is not necessarily confined to the use of acoustic waves, any signals, even electromagnetic waves, that interact with the light beam and produce the diffraction effects characteristic of interaction cells may be employed and fall within the scope of this invention. The expression acoustic wave is used herein for convenience of nomenclature in identifying the signal that reacts with the light beam.

At least for the most part, prior systems and devices of the foregoing character involve intensity or amplitude modulation of the light beam. In distinction, a light beam may be phase modulated. Moreover, it has been found that some of the devices heretofore used for the purpose of amplitude modulating a light beam may also produce a phase modulation of the beam. For example, the very same approach described above, wherein acoustic waves interact with light waves, produces a phase corrugation that moves across the width of the light beam. That is, an initially planar phase wave front of a light beam is caused by the diffraction process to become a moving front of corrugated shape traveling across the beam. This comes about because in the direction of travel of the light wave fronts one part of the light wave front is retarded, and thus moved out of phase, relative to another part of the same light wave front.

It is the general object of the present invention to provide new and improved apparatus for demodulating signal information from such a temporally and spatially phase-modulated light beam.

It is another object of the present invention to provide new and improved apparatus in which the efficiency of detection of the modulated light is enchanced.

A further object of the present invention is to provide new and improved apparatus useful in determining the characteristics of mediums that propagate acoustic waves which exhibit a corrugated shape.

Apparatus embodying the invention is useful for demodulating a beam of coherent monochromatic optical radiation which has been modulated by interaction with an acoustic modulating signal conveying intelligence information to develop in a plane transverse to the direction of beam travel a wave front for the beam having at least phase variations related to, and moving in the aforesaid plane at the velocity of, the modulating signal. The apparatus comprises selection means which is disposed across the path of travel of the beam for selecting the undiffracted component and the first-order diffraction components of the modulated beam. This selection means has a slit which, in width does not exceed one-half the wavelength of the modulating signal. A photodetector spaced downbeam of the selection means responds to the undiffracted and the diffraction components obtained from the beam by the selection means to derive the intelligence information.

The features of the present invention which are believed to be novel are set froth with particularity in the appended claims. The organization and manner of operation of the invention, together with further objects and advantages thereof, may be best understood by reference to the following description taken in connection with the accompanying drawings, in the several figures of which like reference numerals identify like elements, and in which:

Figures 1, 2, 3, 4:
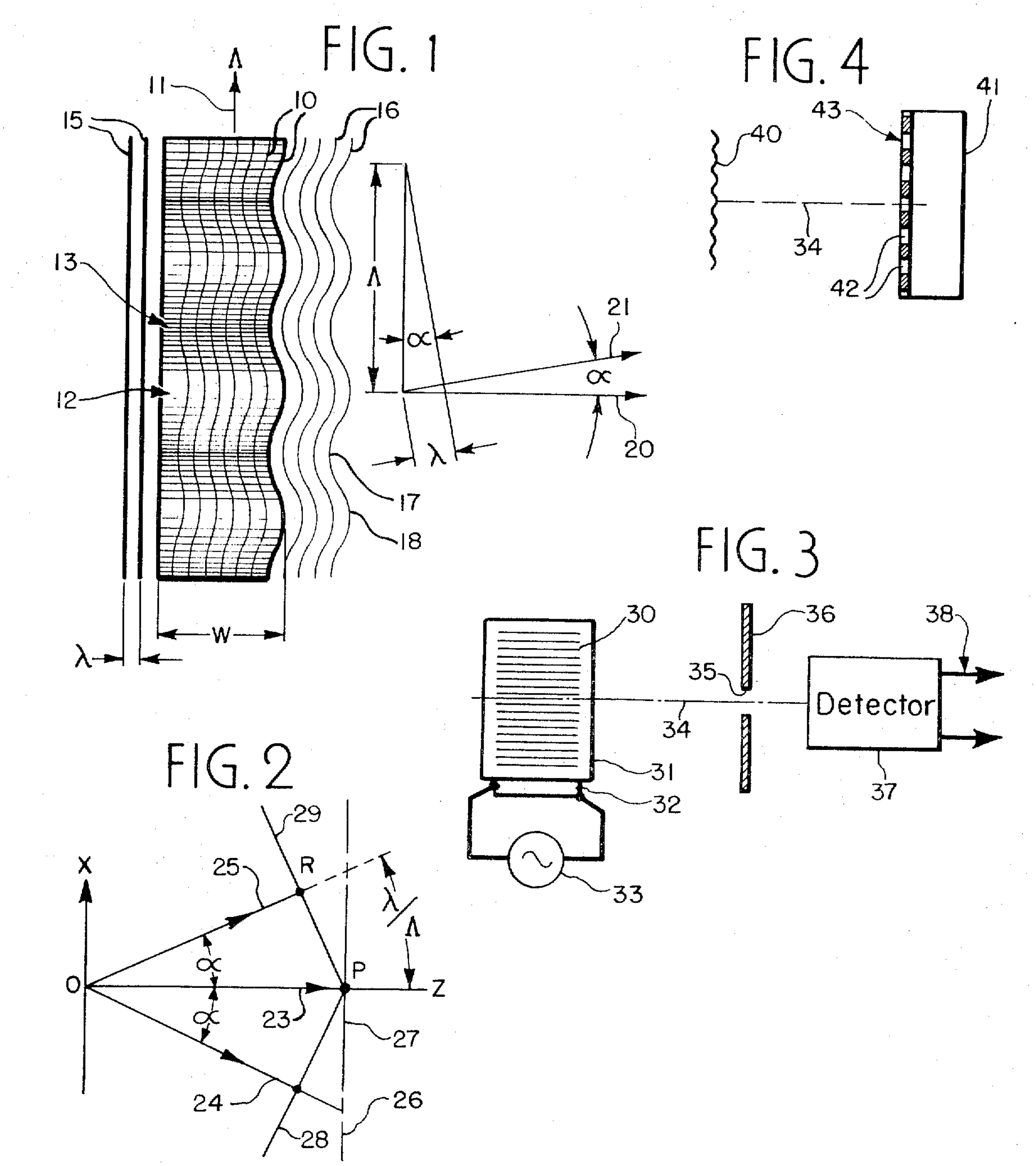
FIG. 1 is a diagram depicting active interaction between light waves and acoustic waves.
FIG. 2 is a plot useful in explaining that interaction process.
FIG. 3 is a diagram of simplified optical apparatus for deriving a signal proportional to phase modulation on a light beam.
FIG. 4 is a diagram of modified form of such optical apparatus.

In FIG. 1, horizontal lines 10 represent intensity variations in a train of acoustic waves propagating in a direction indicated by arrow 11 and of a wavelength $\Lambda$. In this instance, the waves are compressional in nature, being of the bulk mode. The areas 13, where horizontal lines 10 are bunched closely together, indicated compressional maxima, while the areas 12, where the horizontal lines are more sparse, represent compressional minima or rarefactions. As is well known, such waves may be produced by coupling a transducer to a medium which propagates bulk waves. For example, the medium may be composed of a container filled with water and the transducer in the form of quartz crystal that has a vibrating face in contact with the water at one end of the container. Both the walls of the container and the medium are transparent to light "light" being used here in the same sense as specified above to represent optical radiation that may be either visible or invisible.

Directed across the path of the acoustic waves is a beam of monochromatic coherent light, such as that produced by a laser. Upon approaching the sound waves along a path parallel to the acoustic wave fronts and parallel to horizontal lines 10 that represent the modulated intensity of those wave fronts, the light of wavelength $\lambda$ has a phase characteristic in the form of a succession of planar wave fronts as represented by the series of evenly spaced vertical lines 15. In traversing the width $w$ of the acoustic waves, different portions of the light are delayed in phase by the acoustic waves in different amounts, the greater amounts of phase delay of the light occurring where the light traverses areas 12 of highest sound intensity. As a result of the varying amounts of phase delay across the width of the light beam, the phase wave fronts are changed in shape as the light travels across the acoustic waves and they emerge from the interaction region with a corrugated shape as represented in FIG. 1 by generally vertical wavy lines 16.

In a plane transverse to the light beam at the exit of the beam for the interaction region, phasefronts 16 are corrugated. That is, a given portion of the light beam, such as valley 17, is caused to lag behind an adjacent portion such a peak 18. In order words, upon emerging from the region of interaction with the acoustic waves, the light is caused to exhibit essentially only phase modulation. That modulation is proportional to the signals that were applied to the transducer to create the acoustic waves. Of course, FIG. 1 depicts an instantaneous condition. Since in operation of acoustic waves are propagating in the direction of arrow 11, phase corrugations 16 correspondingly move in that direction, which is the direction across the width of the light beam generally perpendicular to the path of light travel. Consequently, the modulated beam is characterized by having a phase wave front in a plane transverse to the direction of beam travel that is corrugated in shape and moves in that plane at the velocity of the modulating signal.

The modulation process may also be viewed in terms of diffraction of the light by the acoustic wave fronts. The diagram in the right portion of FIG. 1 illustrates certain geometrical relationships that exist in the diffraction process. Arrow 20 represents the direction of the incoming light and of that portion of light which remains undiffracted upon emerging from the interaction region. Arrow 21 represents a quantity of the light that has been diffracted as a result of the interaction with the acoustic waves. The angle at which it is diffracted is denoted by the symbol . An examination of the geometry of the diagram reveals the relationship:

$$\sin \alpha=\lambda/\Lambda \qquad (1)$$

In the typical case, wherein the acoustic wavelength is much greater than the light wavelength and the acoustic amplitude $\Delta$ is much smaller in magnitude than the light wavelength, the angle $\alpha$ in practice is approximately the same as the sine of that angle, so that for purposes of analysis angle $\alpha$ may be equated to the value $\lambda/\Lambda$.

With the incoming light traveling substantially parallel to the plane of the acoustic wave fronts, portions of the light beam are diffracted to either side of the path of the undiffracted light into what customarily are termed first orders of diffraction, the undiffracted light being termed to zero order. This is illustrated in the plot of FIG. 2 wherein the zero order or undiffracted light 23 lies along the abscissa or Z-axis. One of the two first orders of light 24 is diffracted below the Z-axis at the angle $\alpha$ while the other first order 25 is diffracted above that same axis at the same angle. Still additional orders of diffracted light may be found to exist in pairs above and below the Z-axis at successive integral multiples of the angle $\alpha$. All these orders together are but a different representation of a phase corrugated wave front, i.e., together they from that wave front by mutual interference. The orders higher than the first are usually significantly weaker in intensity and for present purposes may be ignored.

In FIG. 2, the ordinate designated by the symbol X represents the direction of propagation of the acoustic waves and the origin $O$ is the position along the Z-axis of the phase-modulated light waves emerging from the acoustic wave region. Thus, in the plane $Z=O$, the light exhibits the phase corrugated wave front illustrated at 16 in FIG. 1 and consists of orders 23, 24, and 25. At a distance $OP$ downbeam in the $Z$ direction, the propagating light transverses a plane 26 defined as $Z=OP$. The point $P$ is a point where the wave fronts 28, 29 of the diffracted beam portions 24, 25 intersect with the wave front 27 of the undiffracted beam portion and since the wave fronts are normal to the light beams it is apparent that the undiffracted or zero-order light has travel farther in the $Z$ direction than first-order light portions 24 and 25. Thus, as viewed in plane 26, the light in zero-order beam component 23 lags the first-order components and plane 26 is selected as that a which the zero-order light has been shifted in phase by 90° relative to the mutual phase relationship between the zero and first orders at origin $O$. By reason of this relative phase shift between the zero and the first orders, the phase modulation that existed at origin $O$ has been converted into amplitude modulation in plane 26 That is, the corrugated light wave front in this plane are amplitude modulation of the light beam rater than phase modulation.

It can be shown that there exists a plurality of such planes where the original phase modulation has been converted to an amplitude modulation These planes are at locations successively spaced along the Z-axis at respectively increasing distances corresponding to relative phase shifts of 180°, 270°, 360°, etc.

By analogy to the radio art and noting that the zero order or undiffracted light is an unmodulated, that is to say, undiffracted light portion, it may be thought of as the carrier upon which the signal information is modulated. At the same time, the first orders or the diffracted light portion have intensities that are proportional to the modulation. From the point of reference, plane 26, the modulation quantities in the first orders may be thought of as being "carried" on the unmodulated zero order. It is known in the radio art to detect a phase modulated wave by shifting the radio frequency carrier by 90° and then utilizing what otherwise is amplitude detection of that portion combined with an unshifted portion. In the present case, the zero order carrier similarily has been shifted by 90° relative to the modulation components on the first orders to that a combined wave exists that is subjected to amplitude detection. Here, the geometrical relationships existing between the travel of the zero and the first orders are utilized to obtain the relative phase sift condition and combination.

Considered in more mathematical terms, an examination of FIG. 2 reveals the general condition that:

$$k(OP-OR)=(2m+1)\ \pi/2, \qquad (2)$$

where $k$ is the propagation constant pertaining to the light, i.e., $K=2/\lambda$, and $m$ is an integer ( that may be zero). For typically small values of diffraction angle $\alpha$ ($\kappa/\lambda<<1$) and letting the quantity $OP$ be designated by the term $Z_m$, the geometry in FIG. 2 may be show to yield the relationship:

$$Z_m=(m+\tfrac{1}{2})\ \kappa^2/\lambda \qquad (3)$$

Thus, in any one of the planes positioned in accordance with the relationship of equation (3), a corrugated wave front of amplitude modulation exists The corrugated wave front moves across the light beam with a velocity $V=\Omega/\beta$, where $\Omega$ is the frequency of the diffracting acoustic waves and $\beta$ is their wave number.

FIG. 3 illustrates a simplified approach to the detection of the corrugated wave fronts at the amplitude-modulation locations. Here, an acoustic wave train 30 is launched in a propagating medium 31 of a light-sound interaction cell by a transducer 32 coupled to that medium and driven by a modulating signal source 33. The incoming coherent light beam is directed along an axis 34 through the interaction cell and through a slit or aperture 35 defined in an otherwise light-opaque screen 36 located in accordance with equation (3). Beyond slit 35 is a photodetector 37 that responds to he intensity of the light it receives to deliver to its output terminals 38 an electrical output signal which is proportional to the received light intensity. The position of slit 35 is critical as explained above but the position of detector 37 is not; it responds to the light components as determined by slit 35. In order properly to detect the amplitude modulation representing the modulating signal, slit 35 is given a width, in the direction across the light beam parallel to the path of the acoustic waves, that is equal to or less than one-half the acoustic wavelength ($\Lambda/2$ ). With any larger width, the detector begins to average the peaks with the valleys of the corrugations and the detection efficiency drops. If the slit were to have an effective width of one acoustic wavelength, the polarity variations of the amplitude modulation would cancel one another across the active surface of the detector giving a zero output. At detector 37, the detection process may also be considered as one of beating together or heterodyning the diffracted and undiffracted light portions, since as is well known, the diffracted portions are shifted in frequency with respect to the undiffracted portions. The output signal of detector 37 is proportional the original signal modulation from source 33.

While the system in FIG. 3 has been utilized in practice, it is inefficient in that only a small port of the approaching light beam is detected. In order to enhance the detection efficiency still further, a multiplicity of slits may be employed, positioned ahead of the detector and so arranged that a plurality of portions of the approaching beam are detected and contribute cumulatively in the detection process. This is illustrated in FIG. 2 wherein a light beam, exhibiting a transversely moving corrugated wave front is represented at 40 and follows axis 34 into a photodetector 41. Disposed ahead of the active surface of the photodetector are a laterally spaced plurality of slits 42 defined in a grating 43 which is composed of these slits and intervening opaque sections and located in accordance with equation (3). Slits 42 individually are of a width equal to or less than the value /2 and the alternation of the optically transparent and opaque areas is assigned a period of one acoustic wavelength (Λ). The light responsive surface of detector 41 in this case is arranged to respond to the light exiting from each of slits 42. The light portions that are received by the photodetector through the different slits all are in additive phase relationship as a result of which detector 41 yields an output signal of substantially increased level.

In addition to increasing the detection efficiency, grating 43 acts as a band-pass filter having a center frequency corresponding to the frequency of the modulating acoustic wave signal. The bandwidth of the filter response is a function of the number of slits 42 and the shape of the response curve may be altered by modifying the mutual arrangement of the opaque and slit sections of grating 43. For an acoustic wavelength matched to the slit spacing as described above, it may be shown that maximum response is obtained by making the slit width exactly equal to the value Λ/2. It is also to be noted that a degree of modifying the effective filter response is available simply by rotating grating 43 in the plane of the drawing to vary the effective slit width in a plane normal to axis 34, that is, the effective slit width presented to the oncoming light in the direction of movement of the corrugated wave front As still further modification, and recalling that the purpose of grating 43 is to permit cumulative addition of phase-related different portions of the same corrugated wave front the function of the grating is combined with the photodetector by forming the latter as a plurality of individual photodetecting elements arranged side-by-side with a periodicity of Λ/2 and with each pair of adjacent individual detectors mutually reversely connected to a common load so that all parts of the incoming corrugated wave fronts are cumulatively added in the output signal. This version may be deemed to be represented by FIG. 4 with the transparent areas of grating 43 representing one polarity of the individual detectors and the opaque areas representing the other. The two sets are connected in mutually reverse fashion to the load so that the detected signals add.

Figure 5:
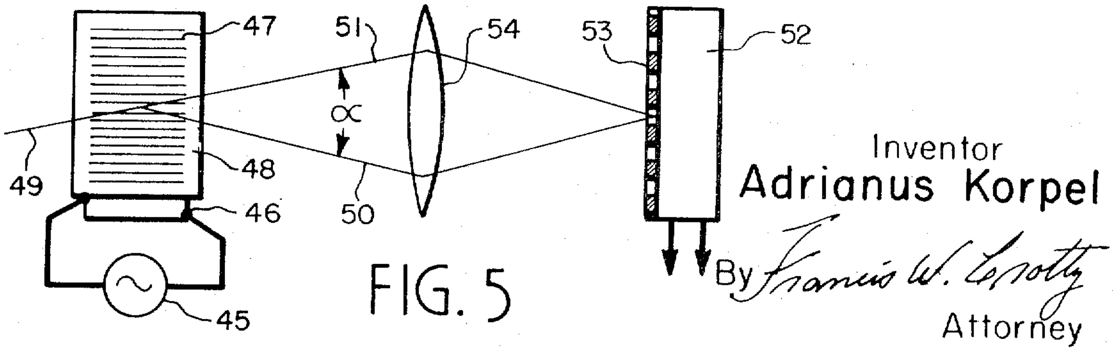
FIG. 5 illustrates another modification of such apparatus.

The diffraction process discussed above is one wherein the light travels in a direction essentially perpendicular to the direction of travel of the acoustic waves. This condition is applicable to interaction cells having a width or interaction region $w$ that is relatively small, i.e., $w<<\Lambda^2/\lambda$, and is called Debye-Sears diffraction. The effect is that of a tin phase grating moving across the light beam with the velocity of the modulating signal and the grating constant is a function of that signal. The resulting modulation of the light beam is essentially only phase modulation. For larger interaction lengths, the incoming light beam is arranged to approach the acoustic wave fronts at an angle and is reflected by the latter as if they were a succession of moving mirrors. This is illustrated in FIG. 5 wherein modulating signals from a source 45 fed to å transducer 46 launch a train of acoustic waves 47 in a propagating medium 48 of an interaction cell. Light approaching along a path 49 at an angle to the illustrated acoustic wave fronts is, in part, reflected into a path 50 forming an angle $\alpha$ with the path 51 of the undiffracted light. There is but a single order of diffracted light where the angle $\alpha$ between the diffracted and undiffracted beam portions has a value known as the Bragg angles, defined by the relationship:

$$\sin \alpha/2=\lambda/2\Lambda. \quad (4)$$

In this case the output of the interaction cell is simply the beam portions 50 and 51 of FIG. 5.

The combination of the diffracted and the undiffracted beam portions at their exit from the interaction region again yields a wave front of corrugated shape moving laterally of the light beam. However, in this case the corrugation is a manifestation of both phase and amplitude modulation; that is, in contrast to Debye-Sears diffraction the arrangement of FIG. 5 produces a combination of phase and amplitude modulation of the light beam. In order to detect the amplitude-modulation content of the wave front use again is made of a photodetector 52 preceded by a grating 53 having slit widths and spacings selected as in the case of grating 43 of the system of FIG. 4. That is, the slits individually have a width the same as or less than one-half the acoustic wavelength and a periodicity that preferably is equal to one acoustic wavelength. In contrast with the case of Debye-Sears diffraction, there are in this case no critical planes at which the grating should be located because, while the combined phase and amplitude modulation are present everywhere along the emerging light path, only the amplitude modulation is detected. In principle, grating 53 even may be located physically at the point of interaction of the light with acoustic waves 47. For practical convenience, however, the same effect is obtained by spacing grating 53 some distance beyond the acoustic-wave interaction region and then imaging an imaginary plane, located at least approximately at the position of emergence of the light waves from the interaction cell, onto the plane defined by grating 53. This is readily achieved by interposing a convergent lens 54 between the cell and the grating, the lens being selected to have a focal length making the one plane the optical conjugate of the other. As before, the diffracted and the undiffracted beam portions are supplied to the detector and the undiffracted beam following path 51 serves as the carrier or local oscillator of a heterodyne detection process for demodulating the diffracted light following path 50 and carrying the desired signal information.

In theory, the detection process involved in the FIG. 5 system is only 50 percent efficient because the phase-modulated portion of the light is not detected. The system may be modified, however, to produce a pair of acoustic-wave trains in cell 48 that diverge away from one another and through both of which the light beam is caused to pass. Exiting from such a composite acoustic-wave region are one light beam composed of the undiffracted portion of the original light together with a first beam diffracted by one of the acoustic wave trains and a second beam diffracted by the other. By proper selection of the angle between the two acoustic wave trains, the two diffracted beams follow paths directed in opposite but in equiangular directions away from and to either side of the undiffracted beam. Hence, the situation is analogous to that illustrated in FIG. 2 with a diffraction order appearing to either side of a zero or undiffracted order. Correspondingly, the preferred manner of detecting is that previously discussed with respect FIG. 4 that is to say, by properly positioning a grating similar to grating 43 relative to the interaction cell. Either two angularly related flat transducers may be utilized to develop a pair of diverging acoustic-wave trains in the interaction cell or a composite transducer arrangement may be employed, such as that described and illustrated in copending application Ser. No. 600,500, filed Dec. 9, 1966, now abandoned, by Robert Adler and assigned the same assignee as is the present application.

Lens 54 in FIG. 5 is intended to illustrate the use of any conventional optical system to permit the location of selection grating 53 wherever is most convenient in practice. Quite similarly, a lens or lens system may be employed in the apparatus of either of FIGS. 3 and 4 so as to image the plan, at which the phase corrugation has been converted into an amplitude corrugation, to any other desired physical location.

Figure 6:
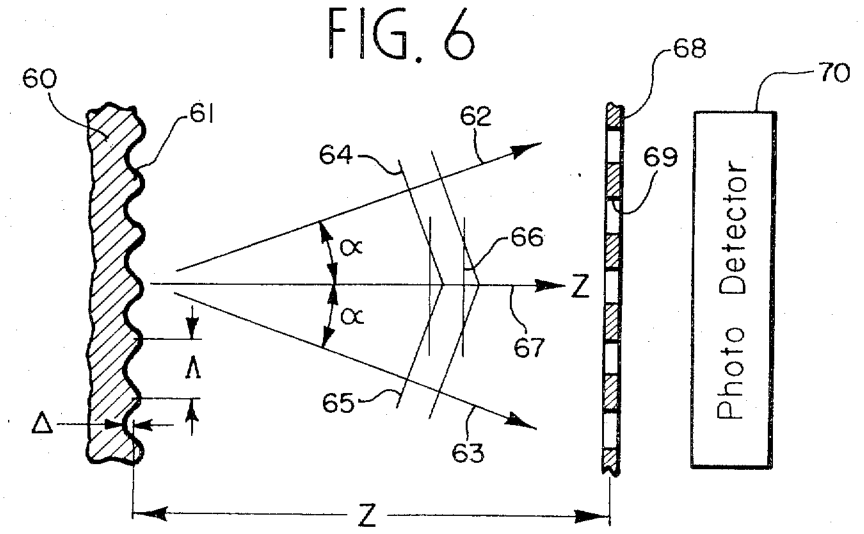
FIG. 6 is a diagrammatic representation of still another modification of such apparatus.

FIG. 6 represents an adaptation of the underlying principal of this invention to a different mode of diffractive interaction between acoustic and light waves. In this case, acoustic surface waves are caused to propagate along the surface of a substrate 60. Substrate 60 may, for example, be a ferroelectric ceramic on a surface of which acoustic waves are launched by an interdigital electrode array as described and illustrated more fully in a copending application of Adrian DeVries, Ser. No. 582,387, filed Sept. 27, 1956, now U.S. Pat. No. 3,493,759 and assigned to the assignee of the present application. When unexcited, the surface is plain and smooth. When propagating the acoustic waves, however, the surface is corrugated as indicated at 61 in FIG. 6. The acoustic corrugation, launched with straight parallel wave fronts and again of wavelength Λ, has an amplitude Δ that is much less than the light wavelength λ. Plane waves of light, not shown coming from the right in FIG. 6, strike surface 61 with perpendicular incidence. Absent excitation of the surface waves, when surface 61 is uncorrugated the reflected light also is a plane wave that travels in a direction normal to the surface (in a direction $Z$ as in FIG. 2). However, when surface 60 is corrugated by reason of its propagation of acoustic waves, the reflected optical wave fronts immediately adjacent to surface 61 exhibit a phase corrugation similar to that represented by wave fronts 16 in FIG. 1. That is, surface 61 in effect is a corrugated mirror that constitutes a reflection phase grating and by diffraction develops a number of new plane waves or orders of light. With typically small corrugation amplitudes, only those of the first orders 62 and 63 are sufficient. The resulting corrugated wave fronts stem from the physical combination of the respective individual wave fronts 64 and 65 with the individual wave fronts 66 of the undiffracted or zero order wave following path 67.

It can be shown that the diffracted quantities 62 and 63 are related in amplitude to the amplitude of the original reflected light by the quantity $\Delta(2\pi/\lambda)$. Also as previously explained with respect to FIGS. 1 and 2, the diffracted orders propagate in directions forming an angle $\alpha$ with respect to the zero or undiffracted order. The apparent phase velocity of the first orders in the zero-order direction consequently is larger than the speed of light by the geometrically-determined factor 1/cos ( λ/Λ) which is approximately equal to the quantity $1+(1/2)\lambda^2/\Lambda AQ2$. That is, the diffracted orders advanced in phase respect to the zero order. This phase advance equals $2\pi$ radians after a trip of $2\Lambda^2/\lambda^2$ light wavelengths or physical distance of $2\Lambda^2/\lambda$. Again as before at the emergence of the diffracted and undiffracted light portions from the acoustic wave trains ($Z$=0, the relative phase between the diffracted orders and the zero order is such as to form a phase corrugation of the combined wave front. This difference in effective phase velocity in the $Z$direction of diffracted orders 62 and 63 and zero-order 67 produces cyclic transitions between phase and amplitude corrugations, there being two such cycles for each $2\pi$ radians of phase advance. Consequently, a pure amplitude corrugation again exists at distances $Z_m$ in accordance with the relationship expressed in equation (3).

It may also be shown that the fractional spatial modulation of the light amplitude at the optimum locations indicated by equation (3) is the value $4\pi\Delta/\lambda$; this corresponds to the sum of the relative amplitudes of the two diffracted orders. Of course, FIG. 6 illustrates the instantaneous picture with all corrugations stationary. With the actual corrugations moving wit the acoustic waves, the detection process need only include a detector and a narrow slit located at a selected position as already explained in connection with FIG. 3. Further, the preferred detection arrangement is that of FIG. 4. Consequently, the system in FIG. 6 includes a Ronchi grating 68 having its individual slits 69 each equal to or less than one-half an acoustic wavelength wide and spaced one acoustic wavelength apart Beyond or downbeam from grating 68 is a photodetector 70.

The use of a grating instead of single slit not only increases the system sensitivity but also renders the location of the light beam incident upon surface 61 less critical, provided that the width of the beam is such as to embrace several of the slits in the grating. In theory, any of the distances $Z_m$ can be used for detecting the signal. In practice, the smallest spacing ($m$=0) is found to be best because that choice insures a maximum overlapping of all three beams 62, 63 and 67 within the width of the reflected light beam and this in turn results in a maximum signal output.

The basic system illustrated in FIG. 6 has been successfully utilized as a measurement technique to ascertain attenuation and reflection characteristics of acoustic surface waves on various surfaces, and hence to determine characteristics of the surfaces themselves. While, as discussed in regard to the apparatus of the earlier figures, the techniques disclosed utilized optical heterodyning at the detector, they are particularly advantageous in that no separate, precisely aligned local-oscillator beam is required as is the case in certain previously disclosed approaches for similar purposes. As a measurements technique, the system of FIG. 6 avoids other undesirable features of prior approaches such as the use of critically positioned spatial filters including knife edges and wires, and it is insensitive to random warping or unsmoothness of the substrate.

Figure 7:
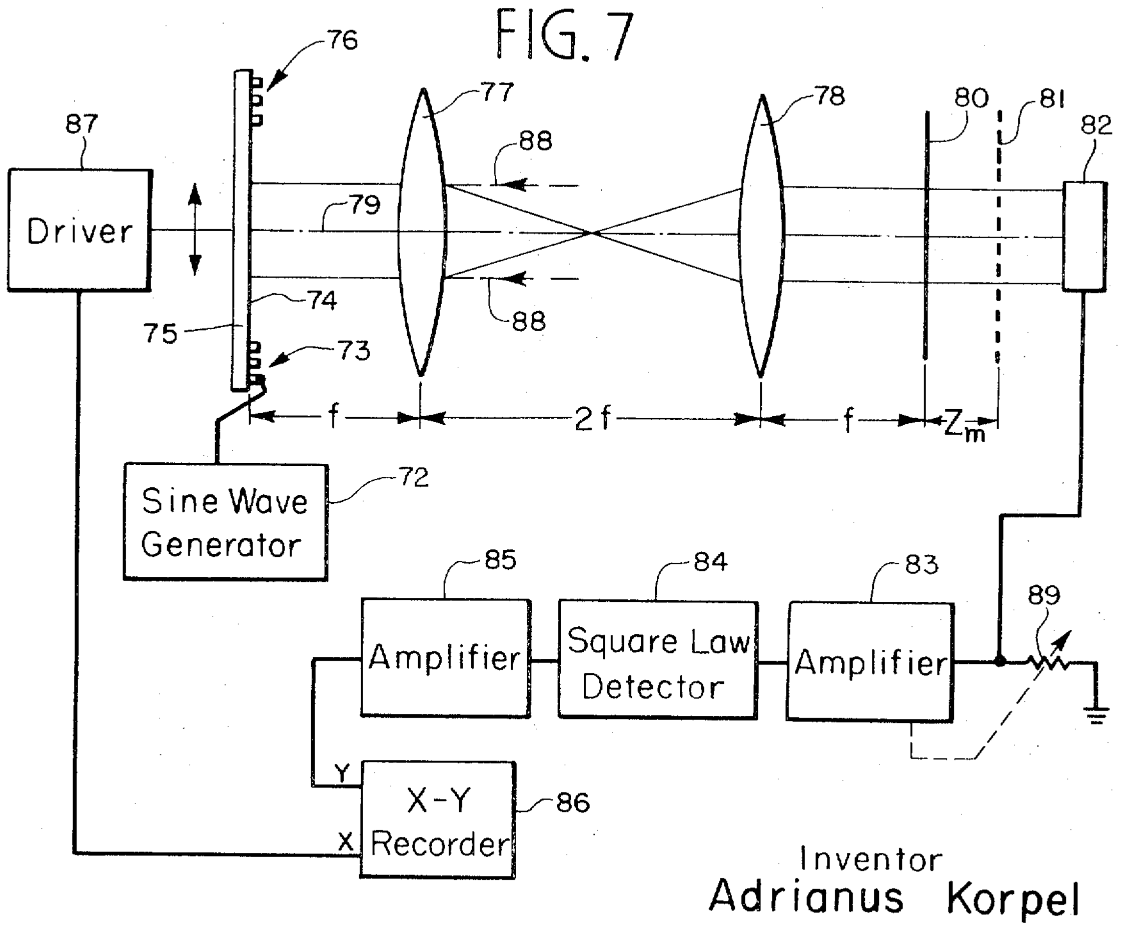
FIG. 7 is a schematic diagram, partially in block diagram form, of a still different modification of such apparatus included in a measurement system.

One successful form of such a measurements system is illustrated in FIG. 7. In that system, modulating signals from a sine-wave generator 72 drive an interdigital electrode array 73 near one end of a surface 74 of a substrate 75 formed of a ferroelectric ceramic. In this case, a second and similar interdigital transducer 76 is disposed on the same surface near the opposite end of substrate 75, and, alternatively, is either tuned to antiresonance to act as a surface-wave reflector or is shorted so as not to interfere with the propagation of the surface waves. The edges of substrate 75 preferably are roughened in order to prevent specular reflection. As mentioned above, a more detailed description of such a surface-wave developing and propagating structure will be found in the DeVries application. It will suffice for present purposes to note that the electrodes of the interdigital array are successively spaced apart along the substrate with a center-to-center separation of one-half wavelength at the desired acoustic signal frequency.

A one-power telescope composed of convergent lenses 77 and 78 is disposed on a zero-order axis 79 to image the plane defined by surface 74 onto an an imaginary image plane 80. Spaced beyond the latter by a distance $Z_m$ is a grating 81 and then a photomultiplier 82. Grating 81 is assigned a slit width and periodicity the same as described above relative to the acoustic wavelength Λ.

The output signal for photomultiplier 82 is fed to an amplifier 83 and thence into a square-law detector 84. A signal derived by the latter is then amplified further in another amplifier 85 and supplied as the Y input to an X–Y recorder 86. At the same time, a mechanical drive system 87 is coupled to substrate 75 to move the substrate back and forth in the vertical direction as illustrated. System 87 provides an electrical signal proportional to the amount of such movement and this is supplied as the X input to recorder 87.

In use, the inclusion of the telescope enables locating grating 81 at the smallest spacing ($m$=0) from the effective location of the moving phase corrugations while yet permitting the actual physical location of grating 81 and photomultiplier 82 at a sufficient distance from substrate 75 to permit ready entrance of the incident light beam represented by arrows 88. In practice, that incoming light beam is introduced into the system at a slight angle to the plane of the drawing so as to clear lenses 77 and 78.

In operation of an exemplary system, the incident light was produced by an He–Ne laser that developed a parallel beam of light having a wavelength λ of 0.63 μm. The acoustic wavelength of the surface waves as 250 μm, yielding a value of $Z_m$ at $m$=0 of 5 cm. Grating 81, formed to have one-hundred opaque line per inch, was placed a distance of 5 centimeters away from image plane 80. The frequency of the signal applied to transducer 73 was 8 MegaHertz modulated with a square wave having a repetition frequency of 1,000 Hertz. Consequently, amplifier 83 was designed to transmit a selected 8 megahertz signal, while amplifier 85 was tuned to 1,000 Hertz with a bandwidth of 20 Hertz. By coupling the X-axis of recorder 86 to the mechanical drive system, an actual plot of the resulting sound field was recorded.

Preferably, an automatic gain control, indicated by potentiometer 89, varies the load resistance of photomultiplier 82 in a manner to keep the direct-current potential across that load resistor constant during the travel of the substrate. This eliminates errors arising from local changes in reflectivity of the substrate or movement of the reflected light across the grating by reason of warping of the substrate. Both standing and traveling-wave patterns have been reproduced by recorder 86 utilizing the described apparatus. The ordinate (Y-direction) is proportional to the square of the sound field, and the distance between neighboring maxima is equal to one-half wavelength of the sound if standing waves are measured.

Several different systems have been disclosed that enable the detection of signal intelligence phase modulated upon a light beam. Involved in the optical processing techniques is the conversion of the phase modulation of light to amplitude modulation. The underlying principles are applicable to different types of acousto-optical diffractive interaction, and a complete system has been described and illustrated for use in measuring different surface wave characteristics. In each case, however, the different optical components actually involved may be of a most fundamental and simple nature and the total number of such components required is but very few.

While particular embodiments of the invention have been shown and described it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. Apparatus for translating intelligence information as a modulation of a beam of coherent monochromatic optical radiation comprising:

means interposed in the path of said beam for diffracting said beam with an acoustic modulating wave travelling in a direction transverse to that of said beam and carrying said intelligence information, said beam being diffracted into an undiffracted component and at least two diffracted components differing in frequency from said undiffracted component, said components becoming spatially coincident with each other to develop in a plane transverse to the direction of travel of said beam a wave front having essentially only phase variations related to, and moving in the same plane at the velocity of, said modulating wave;

selection means disposed transversely to the direction of travel of said beam at a distance from the region of diffraction of said beam so as to intercept said wave front where said phase variations shall have been converted to amplitude variations, for selecting said amplitude variations of one polarity of said wave front while attenuating variations of opposite polarity, said selection means having a slit of width not exceeding one-half the wavelength of said modulating signal;

and a photodetector spaced downbeam of said selection means and responsive to said amplitude variations selected by said selection means due to said spatially coincident and frequency-differing components to develop a signal bearing said intelligence information.

2. Apparatus in accordance with claim 1 in which said means for diffracting said beam comprises a medium propagative of acoustic surface waves together with means for launching said acoustic wave along said surface and in which said beam impinges upon said surface for diffraction by said surface wave.

3. Apparatus in accordance with claim 1 in which said means for diffracting said beam is a Debye-Sears diffraction cell diffracting said beam into a zero order and a plurality of higher order diffraction components to develop said wave front having essentially only phase variations in accordance with said modulating wave.

4. Apparatus in accordance with claim 1 in which said selection means includes a plurality of slits placed transversely to the direction of said beam at said distance where said wave front exhibits amplitude variations and spaced at intervals substantially equal to the wavelength of said acoustic modulating wave to select only the zero and first order diffraction components.

5. Apparatus in accordance with claim 1 in which said radiation has a wavelength λ, in which said wave front has a corrugated configuration of wavelength Λ, and in which said selection means is positioned from the region of diffraction of said beam by said acoustic wave in accordance with the following relationship:

$$Z_m=(m+\tfrac{1}{2})\,\frac{\Lambda^2}{\lambda}$$

where $m$ is an integer including zero.

6. Apparatus in accordance with claim 5 which includes an optical system for imaging the diffraction region of said beam and said modulating waves in a second plane spaced in a direction beam travel and in which said selection means is spaced from said second plane in a direction away from said diffraction region by said distance $Z_m$.

7. Apparatus in accordance with claim 1 in which said slit and photodetector are combined and take the form of a plurality of individual photodetecting elements arranged side-by-side in said plane with a periodicity of half the acoustic wavelength and with adjacent ones of said photodetecting elements mutually reversely connected to a device for utilizing said intelligence information.